United States Patent [19]
Schuhmacher et al.

[11] 3,886,188
[45] May 27, 1975

[54] PRODUCTION OF PURE 1-AMINO-4-NITROANTHRAQUINONE-2-CARBOXYLIC ACID

[75] Inventors: Alfred Schuhmacher; Gerd Schwantje, both of Ludwigshafen, Germany

[73] Assignee: BASF Aktiengesellschaft, Ludwigshafen/Rhine, Germany

[22] Filed: Sept. 20, 1973

[21] Appl. No.: 399,174

[30] Foreign Application Priority Data
Sept. 27, 1972 Germany............................ 2247347

[52] U.S. Cl. ............................................... 260/376
[51] Int. Cl. .............................................. C09b 1/22
[58] Field of Search ........................ 260/376, 244 B

[56] References Cited
OTHER PUBLICATIONS
FIAT, 1313, II, 70.
BIOS, 987, 17.
Brewster et al, Organic Chem., 3rd Ed., p. 422, (1964).
Carter, Organic Reactions, III, pp. 213–217, (1962).

Primary Examiner—Lorraine A. Weinberger
Assistant Examiner—E. Jane Skelly
Attorney, Agent, or Firm—Johnston, Keil, Thompson & Shurtleff

[57] ABSTRACT

An improvement in the process for the production of 1-amino-4-nitroanthraquinone-2-carboxylic acid from 1-aminoanthraquinone-2-carboxylic acid by reaction with formaldehyde in concentrated sulfuric acid and nitration of the reaction product into 1,2-dihydro-6-nitro-7,8-diphthaloyl-3,1,4H-benzoxazone-4 followed by hydrolysis of the same. The improvement consists in precipitating the benzoxazone derivative by adding a precipitant, hydrolyzing the isolated benzoxazone derivative in aqueous solution and precipitating the 1-amino-4-nitro-anthraquinone-2-carboxylic acid from the alkaline solution by acidification. 1-amino-4-nitroanthraquinone-2-carboxylic acid is obtained in a purity of 95 percent by weight or more.

6 Claims, No Drawings

PRODUCTION OF PURE 1-AMINO-4-NITROANTHRAQUINONE-2-CARBOXYLIC ACID

The invention relates to an improvement in the process for the production of pure 1-amino-4-nitroanthraquinone-2-carboxylic acid.

According to FIAT 1313, II, 70 and BIOS 987, 17, the production of 1-amino-4-nitroanthraquinone-2-carboxylic acid can be carried out in the following way: 1-aminoanthraquinone-2-carboxylic acid is reacted with formaldehyde in concentrated sulfuric acid to form 1,2-dihydro-7,8-diphthaloyl-3,1,4H-benzoxazone-4, this is nitrated with a mixture of nitric and sulfuric acids (Belgian acid) at a temperature below 0°C, and the resulting 1,2-dihydro-6-nitro-7,8-diphthaloyl-3,1,4H-benzoxazone-4 is hydrolyzed in sulfuric acid dichromate solution into 1-amino-4-nitroanthraquinone-2-carboxylic acid which is isolated in a purity of from 85 to 90 percent by weight. The acid hydrolysis of 1,2-dihydro-6-nitro-7,8-diphthaloyl-3,1,4H-benzoxazone-4 into 1-amino-4-nitroanthraquinone-2-carboxylic acid only takes place quantitatively in the presence of an oxidizing agent. Probably the 1,2-dihydro-6-nitro-7,8-diphthaloyl-3,1,4H-benzoxazone-4 is first oxidized by dichromate in sulfuric acid solution into 6-nitro-7,8-diphthaloylisatoic anhydride whereupon this is converted by acidolysis into 1-amino-4-nitroanthraquinone-2-caboxylic acid. Moreover byproducts formed in the nitration such as 1-amino-4-hydroxyanthraquinone-2-carboxylic acid and 1-amino-2-nitroanthraquinone and also unreacted starting material are substantially degraded by the dichromate. These reactions can be monitored by thin layer chromatography.

The 1-amino-4-nitroanthraquinone-2-carboxylic acid obtainable by this method is however not sufficeintly pure for many purposes so that additional purification operations are necessary. Another disadvantage is that the use of chromates or dichromates in industrial processes results in serious contamination of waste water with chromium salts which can only be removed by expensive methods from the strong sulfuric acid mother liquors.

We have now found that pure 1-amino-4-nitroanthraquinone-2-carboxylic acid can be prepared advantageously and without the said disadvantages from 1-aminoanthraquinone-2-carboxylic acid by improving the prior art method which consists in the reaction of 1-aminoanthraquinone-2-carboxylic acid with formaldehyde in concentrated sulfuric acid, nitration of the reaction product into 1,2-dihydro-6-nitro-7,8-diphthaloyl-3,1,4H-benzoxazone-4 followed by hydrolysis of the same, by precipitating 1,2-dihydro-6-nitro-7,8-diphthaloyl-3,1,4H-benzoxazone-4 by the addition of a precipitant, hydrolyzing the isolated precipitate in an alkaline aqueous solution which contains at least the stoichiometric amount of alkali and precipitating the 1-amino-4-nitroanthraquinone-2-carboxylic acid from this solution by acidification.

1-amino-4-nitroanthraquinone-2-carboxylic acid is obtained in a purity of more than 95 percent by weight.

The starting material for the production of pure 1-amino-4-nitroanthraquinone-2-carboxylic acid according to the invention is a sulfuric acid solution of 1,2-dihydro-6-nitro-7,8-diphthaloyl-3,1,4H-benzoxazone-4:

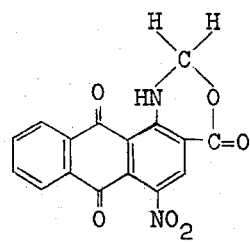

such as is obtained in the nitration of 1,2-dihydro-7,8-diphthaloyl-3,1,4H-benzoxazone-4 by a prior art method. The solution from the nitration may contain up to about 20 percent by weight of nitric acid (based on the reaction mixture) without appreciably disturbing further processing. It is advantageous however to remove the excess nitric acid by adding substances such as urea, sulfanilic acid, hydroxylammonium sulfate, aminosulfonic acid, hydrogen sulfite, dithionite, hydrazine sulfate, m-nitrobenzene, sulfonate or peroxydisulfate. Hydrazine sulfate, hydroxylammonium sulfate, urea and sodium hydrogen sulfite are particularly preferred for reasons of economy.

The substances which react with the nitric acid may be added to the sulfuric acid solution of the 1,2-dihydro-6-nitro-7,8-diphthaloyl-3,1,4H-benzoxazone-4 prior to or at the same time as the precipitant. In the latter case it is convenient to use a solution of the substance in the precipitant. The total amount to be used is determined by the content of excess nitric acid.

Water preferably serves as the precipitant for the precipitation of the 1,2-dihydro-6-nitro-7,8-diphthaloyl-3,1,4H-benzoxazone-4 from the sulfuric acid solution. Mixtures of water with organic solvents which have good miscibility with the sulfuric acid solution and do not cause any undesirable chemical side reactions may however also be used. Mixtures of water with an alcohol, particularly a primary alcohol such as methanol or ethanol, with a glycol such as ethylene glycol or butanediol-1,4, or with a glycol monoalkyl ether such as glycol monomethyl ether, glycol monoethyl ether, glycol monopropyl ether, propylene glycol monomethyl ether or diglycol monomethyl ether are especially suitable. In the latter case mixtures are preferred which contain up to 30 percent by weight of organic solvent mixed with water. A higher degree of purity in the end product is achieved by the use of such mixtures of solvent and water than by the use of water alone.

The amount of precipitant to be added to the sulfuric acid solution of 1,2-dihydro-6-nitro-7,8-diphthaloyl-3,1,4H-benzoxazone-4 is adjusted so that the benzoxazone is precipitated practically completely. This is achieved as a rule when the solution has a sulfuric acid content of from 79 to 72 percent by weight. The precipitant is conveniently dripped in while stirring. It is of particular advantage in carrying out the process that precipitation gives products of high purity in good yields at temperatures of from 0° to 60°C and preferably of up to 45°C; this result is achieved particularly and unexpectedly by adding the said substances which react with nitric acid.

The precipitated 1,2-dihydro-6-nitro-7,8-diphthaloyl-3,1,4H-benzoxazone-4 is in crystalline form and can easily be isolated from the sulfuric acid solution, for example through a filter, and freed from adherent acid by washing.

The subsequent hydrolysis of the 1,2-dihydro-6-nitro-7,8-diphthaloyl-3,1,4H-benzoxazone-4 into 1-amino-4-nitroanthraquinone-2-carboxylic acid is carried out in aqueous alkaline solution. It is preferred to use a solution of an alkali metal carbonate such as sodium carbonate, potassium carbonate or a mixture of the two. Sodium carbonate is preferred because it is cheap.

It is convenient to use for the hydrolysis a solution of an alkali metal carbonate which contains from 0.2 to 10 percent and preferably from 2 to 5 percent by weight of an alkali metal carbonate based on the solution. The amount of alkali metal carbonate should be at least 1 mole per mole of the benzoxazone derivative. It is convenient to use from 1 to 3 and preferably from 1.1 to 1.8 moles of alkali metal carbonate per mole of benzoxazone.

The benzoxazone derivative is introduced while stirring well into the aqueous solution of alkali metal carbonate for the hydrolysis. Hydrolysis is accelerated by heating at from 40°C to the boiling point of the mixture and by efficient stirring. On a commercial scale the hydrolysis is preferably carried out at a temperature of from 50° to 80°C so that a pure 1-amino-4-nitroanthraquinone-2-carboxylic acid (alkali metal salt) is obtained and at the same time in a high space-time yield. Acidification of the alkaline solution precipitates the 1-amino-4-nitroanthraquinone-2-carboxylic acid which can then be separated by a conventional method. The product obtained has a higher degree of purity than 1-amino-4-nitroanthraquinone-2-carboxylic acid obtained by prior art methods.

The process of the invention is described in greater detail in the following Examples. Parts and percentages specified are by weight.

EXAMPLE 1

13 parts of paraformaldehyde is added at 13° to 15°C to a solution of 73.5 parts of 1-aminoanthraquinone-2-carboxylic acid in 1,000 parts of 96 percent sulfuric acid and the whole is stirred for thirty minutes. 39.0 parts of 52 percent nitrating acid is dripped in at −5°C in forty-five minutes and the whole is stirred for another hour at this temperature.

261 parts of water is then dripped in so that the temperature rises to 0°C. Two hours later the precipitated 1,2-dihydro-6-nitro-7,8-diphthaloyl-3,1,4H-benzoxazone-4 is filtered off and washed with 75 percent sulfuric acid and then with water until the reaction is neutral.

The filter cake is heated to 70°C in a solution of 39 parts of sodium carbonate in 900 parts of water while stirring. After about two hours all has gone into solution. The whole is made acid to congo at room temperature with hydrochloric acid and the deposited precipitate is suction filtered, washed with water until it is neutral and dried.

66.6 parts of 1-amino-4-nitroanthraquinone-2-carboxylic acid of 95 percent purity is obtained.

EXAMPLE 2

The procedure described in Example 1 is followed but the precipitation is carried out at 30°C. 51.2 parts of 1-amino-4-nitroanthraquinone-2-carboxylic acid is obtained in a purity of 92 percent.

EXAMPLE 3

A solution of 53.4 parts of 1-aminoanthraquinone-2-carboxylic acid in 670 parts of 96 percent sulfuric acid has 8.6 parts of paraformaldehyde added to it at 13° to 15°C and the whole is stirred for thirty minutes. 26.0 parts of 52 percent nitric acid is then dripped in over 45 minutes at −5°C and the whole is stirred for another hour at this temperature. 6.0 parts of urea is then added and stirring is continued for another thirty minutes at −5°C.

174 parts of water is dripped in at this temperature at such a rate that the temperature rises to 20°C.

Two hours after this the precipitated 1,2-dihydro-6-nitro-7,8-diphthaloyl-3,1,4H-benzoxazone-4 is suction filtered and washed with 75 percent sulfuric acid and then with water until it is neutral. The filter cake is heated in a solution of 26 parts of sodium carbonate in 600 parts of water to 70°C while stirring. After about two hours the whole has dissolved. It is made acid to congo with hydrochloric acid and the deposited precipitate is suction filtered, washed with water until neutral and dried.

44.6 parts of 1-amino-4-nitroanthraquinone-2-carboxylic acid is obtained having a purity of 95.4 percent.

EXAMPLE 4

Example 3 is repeated but the precipitation is carried out at 40°C. 43.2 parts of 1-amino-4-nitroanthraquinone-2-carboxylic acid of 95.1 percent purity is obtained.

EXAMPLE 5

9.5 parts of paraformaldehyde is added at 13° to 15°C to a solution of 53.4 parts of 1-aminoanthraquinone-2-carboxylic acid in 670 parts of 96 percent sulfuric acid and the whole is stirred for thirty minutes. 28.5 parts of 52 percent nitric acid is then dripped in at −5°C over 45 minutes and the whole is stirred for another hour at this temperature. 6.0 parts of urea is then added and stirring is continued at −5°C for another 30 minutes.

A solution of 39.0 parts of sodium hydrogen sulfite in 186 parts of water is then dripped in so that the temperature rises to 30°C. Two hours later the precipitated 1,2-dihydro-6-nitro-7,8-diphthaloyl-3,1,4H-benzoxazone-4 is suction filtered and washed with 75 percent sulfuric acid and then with water until neutral. The filter cake is heated to 70°C in a solution of 26 parts of sodium carbonate in 600 parts of water. All has dissolved after about two hours. It is made congo acid with hydrochloric acid and the deposited precipitate is suction filtered, washed until neutral and dried. 48.7 parts of 1-amino-4-nitroanthraquinone-2-carboxylic acid of a purity of 98.0 percent is obtained.

EXAMPLE 6

Example 5 is repeated but a solution of 19 parts of sodium m-nitrobenzenesulfonate in 185 parts of water is dripped in for the precipitation. 46.9 parts of 1-amino-4-nitroanthraquinone-2-carboxylic acid of 96.2 percent purity is obtained.

EXAMPLE 7

Example 5 is repeated but a solution of 19 parts of ammonium peroxide sulfate in 185 parts of water is dripped in for the precipitation.

45.7 parts of 1-amino-4-nitroanthraquinone-2-carboxylic acid of 97.1 percent purity is obtained.

EXAMPLE 8

Example 5 is repeated but a solution of 19 parts of sodium dithionite in 185 parts of water is dripped in for precipitation.

48.2 parts of 1-amino-4-nitroanthraquinone-2-carboxylic acid of 95.1 percent purity is obtained.

EXAMPLE 9

Example 3 is repeated but the urea is replaced by 6.0 parts of sodium hydrogen sulfite.

47.6 parts of 1-amino-4-nitroanthraquinone-2-carboxylic acid of 95.9 percent of purity is obtained.

EXAMPLE 10

Example 5 is repeated but a mixture of 25 parts of sodium hydrogen sulfite, 105 parts of water and 65 parts of methanol is dripped in for precipitation.

46.8 parts of 1-amino-4-nitroanthraquinone-2-carboxylic acid of 96.9 percent purity is obtained.

EXAMPLE 11

Example 5 is repeated but a mixture of 25 parts of sodium hydrogen sulfite, 138 parts of water and 32 parts of methyl diglycol is dripped in for the precipitation.

44.7 parts of 1-amino-4-nitroanthraquinone-2-carboxylic acid of 97.2 percent purity is obtained.

EXAMPLE 12

Example 1 is repeated but precipitation is not carried out with water but with 262 parts of a 19 percent aqueous solution of sodium hydrogen sulfite. The end product is 68.8 parts of 1-amino-4-nitroanthraquinone-2-carboxylic acid in 95 percent purity.

EXAMPLE 13

Example 1 is repeated but hydrolysis is carried out in a solution which contains 50 parts of potassium carbonate instead of sodium carbonate.

The yield is 67.0 parts of 1-amino-4-nitroanthraquinone having a purity of 95 percent.

EXAMPLES 14 to 17

Nitration and precipitation of 1,2-dihydro-6-nitro-7,8-diphthaloyl-3,1,4H-benzoxazone-4 are carried out as described in Example 5. The benzoxazone derivative obtained is hydrolyzed in sodium carbonate solution as specified in the Table at the temperatures specified therein. The results are collected in the following Table.

Abbreviations used:-
Ex = Example
water = parts of water in the soda solution
soda = parts of soda in the soda solution
H-temp = hydrolysis temperature
Ref = reflux
Hd = duration of hydrolysis
Yield = yield in parts with reference to 53.4 parts of 1-aminoanthraquinone-2-carboxylic acid
Cont = content of 1-amino-4-nitroanthraquinone-2-carboxylic acid

| Ex | Water | Soda | H-temp | Hd | Yield | Cont |
|----|-------|------|--------|-----|-------|------|
| 14 | 600 | 18 | 70 | 3 | 51.1 | 96.1 |
| 15 | 600 | 26 | 98-100 (ref) | 1.5 | 49.4 | 95.2 |
| 16 | 600 | 60 | 70 | 2.5 | 49.8 | 96.4 |
| 17 | 800 | 26 | 70 | 2 | 50.4 | 96.0 |

EXAMPLE 18

8.2 parts of paraformaldehyde is introduced at 13° to 15°C into a solution of 48.5 parts of 1-aminoanthraquinone-2-carboxylic acid (calculated as 100 percent) in 570 parts of sulfuric acid of 96 percent strength and stirred for thirty minutes. 26 parts of 52 percent nitrating acid (Belgian acid) is dripped in at −5°C over 45 minutes and the whole is stirred for another hour at −5°C. 6.5 parts of dihydrazine sulfate is added and stirring is continued for another 30 minutes at −5°C. A mixture of 115 parts of water and 66 parts of sodium bisulfite solution of 38 percent strength is then dripped in in such a way that the temperature rises to 30°C. Two hours later the precipitated 1,2-dihydro-6-nitro-7,8-diphthaloyl-3,1,4H-benzoxazone-4 is suction filtered and washed with 75 percent sulfuric acid and with water until it is neutral. The filter cake is stirred for two hours in a solution of 800 parts of water and 24 parts of sodium carbonate at 70° to 75°C until all has dissolved. This solution is made acid to congo at ambient temperature with 75 percent sulfuric acid. The precipitate is suction filtered, washed with water until neutral and dried. Yield: 46.7 parts of 1-amino-4-nitroanthraquinone-2-carboxylic acid; purity 96.3 percent.

EXAMPLE 19

The procedure of Example 18 is followed but 9.5 parts of dihydrazine sulfate is used. The yield is 46.3 parts of 1-amino-4-nitroanthraquinone-2-carboxylic acid of a purity of 95.4 percent.

EXAMPLE 20

Example 18 is repeated but using 15.5 parts of dihydrazine sulfate. The yield is 46.1 parts of 1-amino-4-nitroanthraquinone-2-carboxylic acid having a purity of 95.7 percent.

EXAMPLE 21

Example 18 is repeated but 5.5 parts of dihydrazine sulfate is used. The yield is 45.3 parts of 1-amino-4-nitroanthraquinone-2-carboxylic acid of a purity of 95.4 percent.

EXAMPLE 22

Example 18 is repeated but 3.5 parts of dihydrazine sulfate is added. The yield is 46.2 parts of 1-amino-4-nitroanthraquinone-2-carboxylic acid of a purity of 95 percent.

EXAMPLE 23

Example 18 is repeated but a mixture of 115 parts of water and 66 parts of sodium bisulfite solution is dripped in so as to raise the temperature to 40°C for the precipitation of the benzoxazone derivative. The yield is 45.6 parts of 1-amino-4-nitroanthraquinone-2-carboxylic acid of a purity of 96.6 percent.

EXAMPLE 24

Example 18 is repeated but a mixture of 155 parts of water and 66 parts of sodium bisulfite solution is allowed to drip in to precipitate the nitrobenzoxazone derivative. The yield is 46.1 parts of 1-amino-4-nitroanthraquinone-2-carboxylic acid of a purity of 95.0 percent.

EXAMPLE 25

Example 18 is repeated but hydrolysis of the benzoxazone-4 is carried out in a solution of 15.5 parts of soda in 800 parts of water at 70°C for 3 hours. The yield is 45.9 parts of 1-amino-4-nitroanthraquinone-2-carboxylic acid of a purity of 97 percent.

EXAMPLE 26

Example 18 is repeated but the benzoxazone-4 is hydrolyzed in a solution of 80 parts of soda in 800 parts of water at 70°C for three hours. The yield is 49.4 parts of 1-amino-4-nitroanthraquinone-2-carboxylic acid in a purity of 95.0 percent.

EXAMPLE 27

Example 23 is repeated but the benzoxazone-4 is hydrolyzed in a solution of 24 parts of soda in 800 parts of water in two hours at refluxing temperature. The yield is 46.2 parts of 1-amino-4-nitroanthraquinone-2-carboxylic acid of a purity of 95.0 percent.

EXAMPLE 28

The procedure of Example 18 is followed but instead of dripping in dilute sodium bisulfite solution 176 parts of water is dripped in so that the temperature rises to 45°C. 44.7 parts of 1-amino-4-nitroanthraquinone-2-carboxylic acid is obtained; purity: 98.3 percent.

EXAMPLE 29

Example 18 is repeated but no dihydrazine sulfate is added to the nitration mixture and instead of the dilute sodium bisulfite solution 163 parts of a 4 percent hydrazine hydrate solution is dripped in. 45.9 parts of 1-amino-4-nitroanthraquinone-2-carboxylic acid having a purity of 95.3 percent is obtained.

EXAMPLE 30

Example 18 is repeated but no dihydrazine sulfate is added to the nitration mixture and instead of the dilute sodium bisulfite solution 168 parts of a 10 percent hydrazine hydrate solution is dripped in. 46.1 parts of 1-amino-4-nitroanthraquinone-2-carboxylic acid of a purity of 96.0 percent is obtained.

EXAMPLE 31

Example 18 is repeated but using 7.0 parts of hydroxylammonium sulfate instead of dihydrazine sulfate. 46.3 parts of 1-amino-4-nitroanthraquinone-2-carboxylic acid of a purity of 95.5 percent is obtained.

EXAMPLE 32

Example 18 is repeated but 146 parts of water is dripped in so that the temperature rises to 30°C. 45.8 parts of 1-amino-4-nitroanthraquinone-2-carboxylic acid of a purity of 95.8% is obtained.

We claim:

1. In a process for the production of pure 1-amino-4-nitroanthraquinone-2-carboxylic acid from 1aminoanthraquinone-2-carboxylic acid by reaction with formaldehyde in concentrated sulfuric acid, nitration of the reaction product to form 1,2-dihydro-6-nitro-7,8-diphthaloyl-3,1,4H-benzoxazone-4 followed by hydrolysis of the latter, the improvement which comprises:

precipitating the 1,2-dihydro-6-nitro-7,8-diphthaloyl-3,1,4H-benzoxazone-4 by adding, as the precipitant, water or a mixture of (a) water and (b) an organic solvent selected from the group consisting of alkanols of one or two carbon atoms, glycols and glycol monoalkyl ethers, the content of (b) being up to 30 percent by weight with reference to (a) + (b);

hydrolyzing the isolated precipitate in a reaction mixture consisting essentially of an aqueous solution of an alkali metal carbonate containing at least 1 mole of alkali per mole of benzoxazone; and precipitating 1-amino-4-nitroanthraquinone-2-carboxylic acid from the resulting solution by acidification.

2. A process as claimed in claim 1 wherein the precipitation of the 1,2-dihydro-6-nitro-7,8-diphthaloyl-3,1,4H-benzoxazone-4 is carried out after the destruction of the nitric acid or in the presence of a substance which destroys nitric acid.

3. A process as claimed in claim 1 wherein the hydrolysis is carried out in a solution of sodium carbonate or of potassium carbonate.

4. A process as claimed in claim 1 wherein from 1 to 3 moles of sodium or potassium carbonate is used per mole of benzoxazone derivative for the hydrolysis.

5. A process as claimed in claim 1 wherein the hydrolysis is carried out at a temperature of from 50° to 80°C.

6. A process as claimed in claim 1 wherein said hydrolysis is carried out at about 40°C up to the boiling point of the reaction mixture.

* * * * *